(12) United States Patent
Gerathewohl et al.

(10) Patent No.: US 7,007,783 B2
(45) Date of Patent: Mar. 7, 2006

(54) AXIALLY FIXED AND ADJUSTABLE DRIVE PLATE

(75) Inventors: Rainer Gerathewohl, Karlsruhe (DE); Volker Becker, Gifhorn (DE); Ingo Steinberg, Calberlah (DE); Andreas Schmidt, Vlotho (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/716,280

(22) Filed: Nov. 18, 2003

(65) Prior Publication Data

US 2004/0134740 A1    Jul. 15, 2004

(30) Foreign Application Priority Data

Nov. 19, 2002  (DE) ................. 102 54 014
Mar. 4, 2003  (DE) ................. 103 09 566

(51) Int. Cl.
*F16D 13/62*   (2006.01)
*F16D 13/68*   (2006.01)

(52) U.S. Cl. ............... 192/70.2; 192/70.16; 403/359.2; 403/359.6 F

(58) Field of Classification Search ............... 192/70.2, 192/70.16, 70.19, 112; 74/437, 438, 434, 74/451; 188/71.5; 403/359.5, 359.6, 359.2
See application file for complete search history.

(56) References Cited

U.S. PATENT DOCUMENTS

| 1,467,732 | A |   | 9/1923  | Litle, Jr. ............... 192/207 |
| 1,518,604 | A |   | 12/1924 | Rosner ................. 192/70.2 |
| 3,069,929 | A |   | 12/1962 | Hansen ................. 74/785 |
| 3,245,508 | A |   | 4/1966  | Livezey ............... 192/70.17 |
| 3,803,872 | A |   | 4/1974  | Wolf ................... 64/9 R |
| 4,945,782 | A | * | 8/1990  | Farrell ................. 192/70.2 |
| 5,384,949 | A | * | 1/1995  | Wodrich et al. ....... 192/70.2 |
| 5,388,474 | A | * | 2/1995  | Tanaka et al. ........ 74/434 |
| 5,979,627 | A |   | 11/1999 | Ruth et al. .......... 192/70.17 |
| 6,044,948 | A | * | 4/2000  | Okada et al. ......... 192/70.2 |
| 6,210,280 | B1 |  | 4/2001  | Nagano et al. ....... 464/68 |
| 6,397,997 | B1 |  | 6/2002  | Kato ................... 192/70.14 |
| 6,695,114 | B1 |  | 2/2004  | Helmstädter et al. .. 192/70.2 |
| 2004/0060795 | A1 | * | 4/2004 | Schmidt et al. ....... 192/70.2 |

FOREIGN PATENT DOCUMENTS

GB  2 275 318 A   8/1994
JP  5-272549 A   10/1993

* cited by examiner

*Primary Examiner*—Rodney H. Bonck
(74) *Attorney, Agent, or Firm*—Greg Dziegielewski; Bliss McGlynn, P.C.

(57) ABSTRACT

A disk carrier assembly for a multi-disk clutch includes a drive plate having a plurality of radially extending load teeth and a plurality of radially extending bearing teeth alternately disposed about the circumference of the drive plate. A disk carrier is included that has an axially cylinder segment with a plurality of axial protrusions that extend radially inward and are alternately disposed about the segment with plurality of axial grooves that extend radially outward. The axial grooves are adapted to radially retain a plurality of clutch disks while allowing operative axial movement. The plurality of axial protrusions further include a plurality of axial load protrusions alternately disposed between a plurality of axial bearing protrusions, each of the axial load protrusion have a load tooth cutout formed on its axial end and each of the axial bearing protrusion have an elongated area with an annular retaining groove.

7 Claims, 4 Drawing Sheets

AXIALLY FIXED AND ADJUSTABLE DRIVE PLATE

BACKGROUND OF THE INVENTION

1. Field of the Invention

The present invention relates, generally to a disk carrier assembly and, more specifically, to an axially fixed disk carrier assembly for a multi-disk clutch for a transmission.

2. Description of the Related Art

Conventional disk clutch assemblies include multiple annular disk shaped outer friction plates, which on their outer circumference are provided with radial outward directed teeth to be axially slidable and fixed against rotation on inwardly facing axial grooves of a drum shaped outer disk carrier. The prior art disk clutch assemblies further include multiple annular disk-shaped inner friction plates, which on their inner circumference are provided with radial inwardly directed teeth to be axially slidable and fixed against rotation in outward facing axial grooves of a cylindrical inner disk carrier. The outer and inner friction plates are arranged alternating axially and are bathed in an oil bath by the surrounding hydraulic fluid. By increasing the pressure of the hydraulic fluid the friction plates are axially pressed against each other, whereby the clutch is closed for the frictional transmission of torque between the outer disk carrier and the inner disk carrier. On the other hand, the disk clutch is opened by the reduction or removal of pressure of the hydraulic fluid.

The following discussion is based upon a conventional disk carrier assembly, wherein the disk carrier exhibits, distributed about the disk-facing circumference of a cylinder segment, alternating axial grooves and axial projections, and which on one axial end is connected with a hub via a drive plate, and wherein, for transmission of torque, a rotationally fixed connection is established between the drive plate and the disk carrier via a slide-in or plug-in gear teeth, in which radial gear teeth provided at the outer circumference of the drive plate engage in corresponding radial recesses in the disk carrier. The disk carrier could be either an outer disk carrier or an inner disk carrier, wherein the axial grooves serve respectively for receiving the disk teeth of the concerned disks or friction plates. In particular in the case of an outer disk carrier, due to the relatively large dimensions, both the disk carrier as well as the drive plate are for weight and cost reasons preferably made as sheet press and punch components.

According to the state of the art, this type of plug-in gearing between the disk carrier and drive plate is designed with axial play factored in to allow for compensation for thermal expansion of the disk carrier and for axial movements of the drive. For example, this type of conventional axial free play of the teeth of the drive plate with respect to the disk carrier is described in DE 33 21 659 A1. However, in an automotive transmission, the drive plate has the task of introducing the torque produced by the drive motor into the disk carrier of a disk clutch such that this existing axial play is disadvantageous before the clutch components heat up and expand. Due to the manner of operation of an internal combustion piston engine the produced torque is not produced evenly over all angles of rotation, but rather is a factor of the number and arrangement of the cylinders, peaking in correspondence with the expansion gas force in the individual cylinder combustion spaces. Additionally, the piston rod of the internal combustion piston motor is caused by the effective gas forces to undergo a periodic warping, which is transmitted to the input side of the transmission or, as the case may be, the preceding motor clutch, and results in a recoiling action of the drive plate. This recoil movement causes, in the case of a conventional drive plate having axial play, an axial slippage between the teeth of the drive plate and the recesses of the disk carrier. The axial slippage causes noticeable drivetrain noise and as the clutch components age, a continued frictional wearing of the affected contact surfaces, which results in excessive amounts of axial play and thus a greater undesired noise output. Therefore, there exists a need for an axially fixed disk carrier assembly that does not include axial play and yet compensates for the thermal expansion of the disk carrier assembly components.

SUMMARY OF THE INVENTION

The disadvantages of the related art are overcome by the present invention of a disk carrier assembly for a multi-disk clutch comprising a drive plate having a plurality of radially extending load teeth and a plurality of radially extending bearing teeth, in which the load teeth and the bearing teeth are alternately disposed about the circumference of the drive plate. A disk carrier having an axially extending cylinder segment includes a plurality of axial protrusions that extend radially inward and a plurality of axial grooves that extend radially outward, the protrusions and the grooves are alternately disposed about the segment. The axial grooves are adapted to radially retain a plurality of clutch disks while allowing operative axial movement. The plurality of axial protrusions further include a plurality of axial load protrusions and a plurality of axial bearing protrusions, each of the axial load protrusion have a load tooth cutout formed on its axial end and each of the axial bearing protrusion have an elongated area with an annular retaining groove. The axial bearing protrusions are alternately disposed between the axial load protrusions.

The drive plate is disposed within the disk carrier such that the load teeth of the drive plate engage the load teeth cutouts preventing radial free play between the disk and the plate and the bearing teeth are operatively disposed circumferentially within the axial bearing protrusions. A securing ring is radially disposed in each of the annular retaining grooves and is adapted to operatively secure the drive plate within the disk carrier by pressing against the bearing teeth such that the load teeth press against the load teeth cutouts thereby removing axial free play between the disk carrier and disk plate.

In this manner, the disk carrier assembly for a multi-disk clutch of the present invention includes a disk carrier and drive plate interface that removes axial slippage thereby preventing resultant noise from the clutch components. The present invention also prevents continued frictional wearing of the affected contact surfaces as the clutch components age.

BRIEF DESCRIPTION OF THE DRAWINGS

Other objects, features and advantages of the present invention will be readily appreciated, as the same becomes better understood after reading the subsequent description taken in connection with the accompanying drawings.

DETAILED DESCRIPTION OF THE INVENTION

Figure 4:
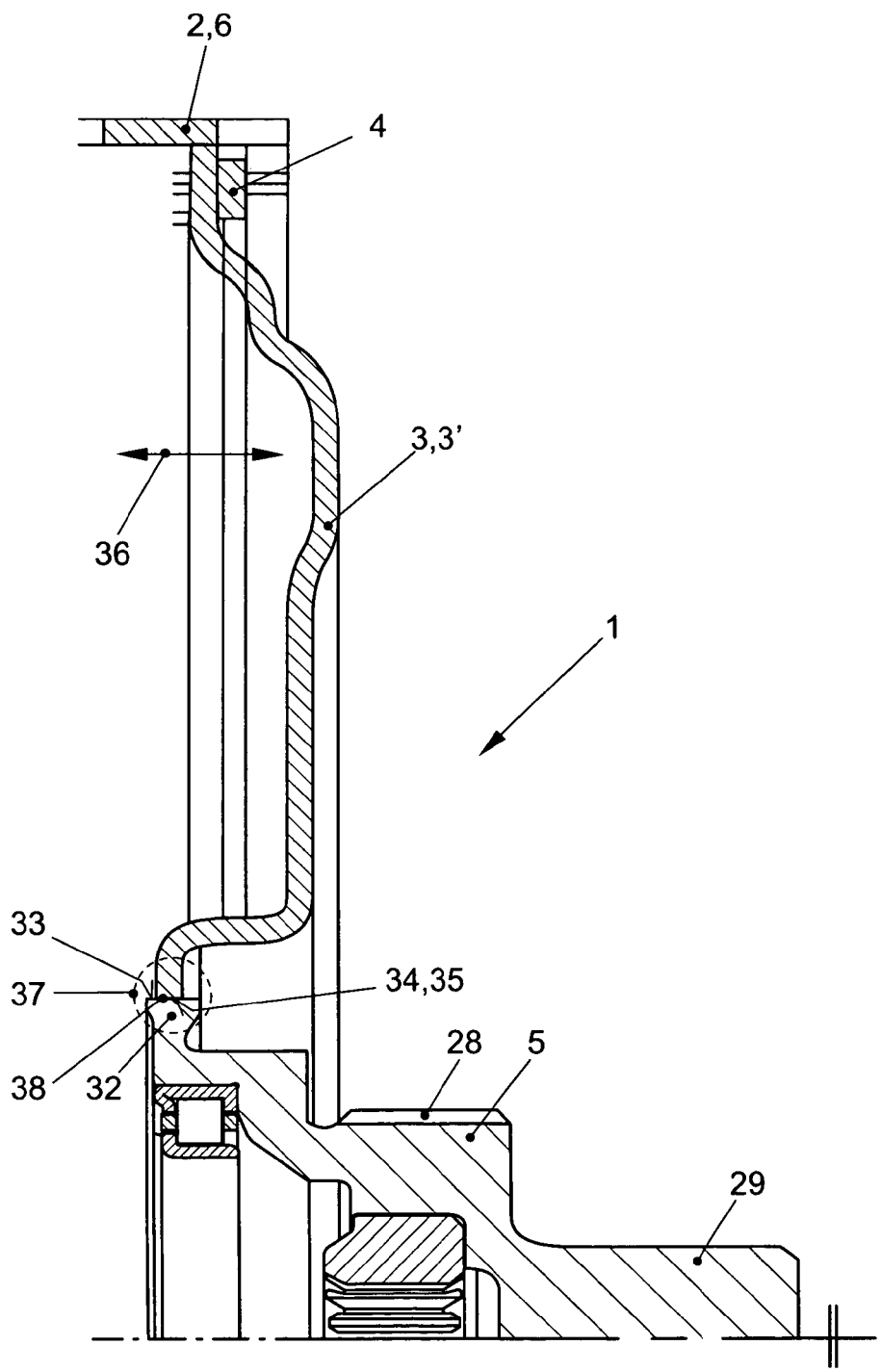
FIG. 4 is the disk carrier, the drive plate, the securing ring and the hub of the disk carrier assembly of the present invention in a radial sectional view.

A disk clutch 1, as shown in FIG. 4 includes a disk carrier 2, 6, a drive plate 3, a securing ring 4 and a hub 5.

Figure 1:
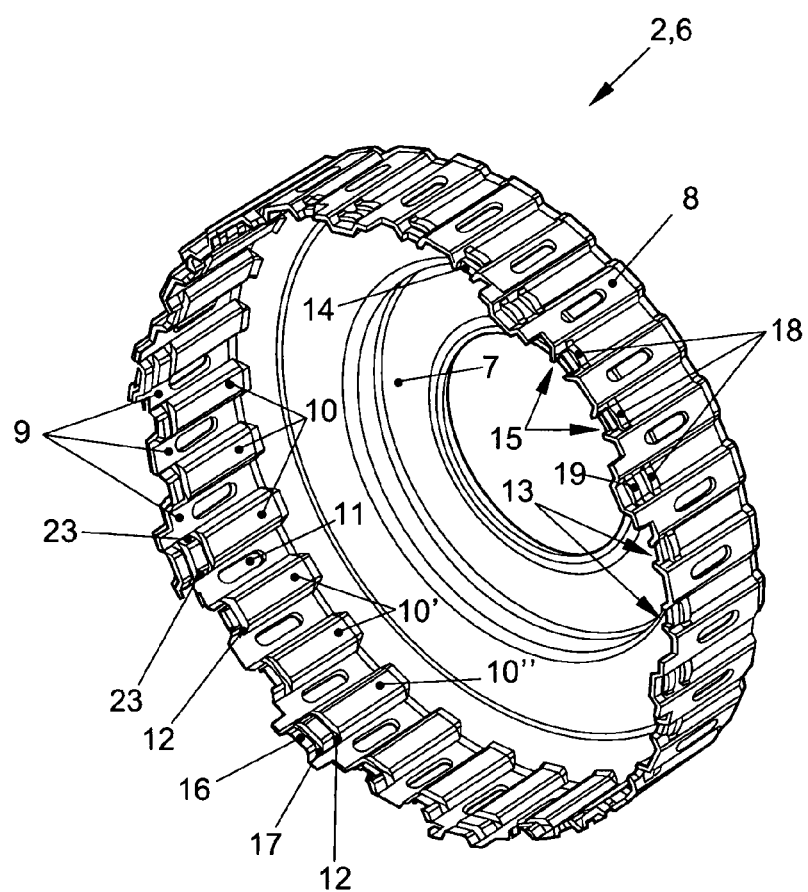
FIG. 1 is a disk carrier of a disk carrier assembly of the present invention in perspective representation.

The disk carrier according to FIG. 1 is in the form of a basket-shaped disk carrier that may be employed as an inner disk carrier 2 or an outer disk carrier 6. For the discussion herein, the disk carrier will be referred to as an outer disk carrier 6. The outer disk carrier 6 includes an annular disk shaped base 7 and a cylinder-casing shaped cylinder segment 8. The segment 8 includes a plurality of axial protrusions that extend radially inward and a plurality of axial grooves that extend radially outward. More specifically, the outer disk carrier 6 exhibits on the cylinder segment 8 alternating axial grooves 9 and axial projections 10 distributed radially inside around the circumference. The axial grooves 9 are provided for engagement of radial outward teeth of multiple, not shown, outer disks and provided approximately centrally with openings 11 for radial flow-through of hydraulic fluid.

The plurality of axial projections 10 exhibit in the area of their free end an overall circumscribing annular groove 12, which is provided for receiving a not shown securing ring for limiting the axial play of the outer disks (not shown). It should be appreciated that the clutch disks (not shown) have circumferential radial notching that corresponds to the axial projections 10 and axial grooves 12 of the disk carrier 2, 6 such that in the case of an inner disk carrier 2, the clutch disk will be operatively slid axially on to the outer circumference of the segment 8. The clutch disks would then be secured to the disk carrier 2 by seating the securing ring in the annular groove 12. In the case of an outer disk carrier 6, the clutch disks will be operatively slid axially into the inner circumference of the segment 8 and secured by seating the securing ring in the annular grove 12.

Further, the plurality of axial protrusions further including a plurality of axial load protrusions and a plurality of axial bearing protrusions. More specifically, the axial load protrusions are indicated in FIG. 1 as first and second axial projection 10', which exhibit on their free end an open-ended load cutout 13 with an axial inner wall 14 and, at the outer periphery, two side walls 15. The plurality of axial bearing protrusions are indicated as third axial projection 10", which are extended or elongated axially on their ends and exhibit in the elongated area 16 a segment of an annular groove 17, which is provided for bearing or supporting the securing ring 4. The annular grooves 12, 17 are in the present case produced respectively by partial radial punching in and out, or as the case may be, pressing of corresponding segments 18, 19 of the axial projections 10. In the preferred embodiment, as illustrated herein, the disk carrier 2 is formed as a sheet press and punch component and the axially open-ended load cutouts 13 can be produced simply and economically by a further punching of the disk carrier 2. However, it should be appreciated that the disk carrier 2, 6 can also be a cast or milled component.

Figure 2:
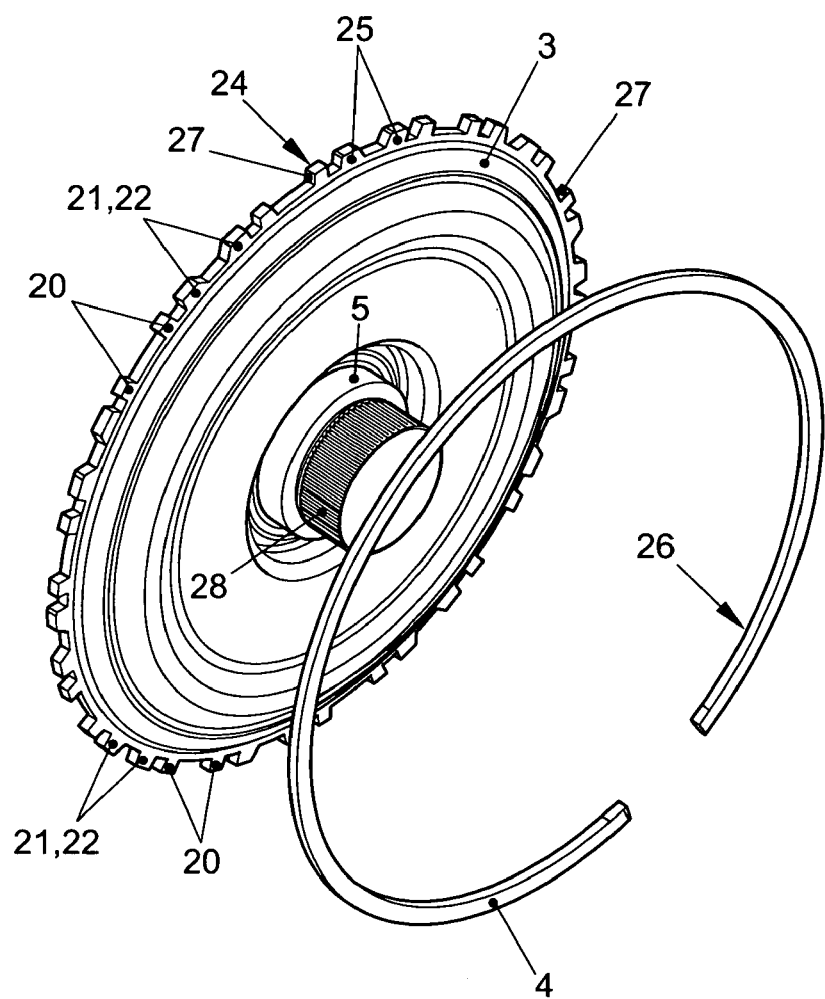
FIG. 2 is a first embodiment of a drive plate of the disk carrier assembly of the present invention in perspective representation.

In FIG. 2 a first embodiment of the drive plate 3 together with the hub 5, and the securing ring 4 is shown. The drive plate 3 has a plurality of radially extending load teeth and a plurality of radially extending bearing teeth that are alternately disposed about the circumference of the drive plate 3. More specifically, the drive plate 3 exhibits teeth 20, 21 on its outer circumference which are differentiated into load teeth 20 and bearing teeth 21. Equally distributed over the outer circumference of the drive plate 3 are each first and second tooth as load teeth 20 and each third tooth as bearing teeth 21. The load teeth 20 exhibit in axial view a substantially quadrilateral cross-section with square sides, are provided for engagement in the cutouts 13 of the disk carrier 2, and serve essentially for transmission of torque between the drive plate 3 and the disk carrier 2. The bearing teeth 21 are formed as pairs of teeth symmetrical and opposite to each other, each having one sloped radial side as bearing tongues 22. The bearing teeth 21 are arranged in pairs to cooperatively support the side flanks 23 of the axial bearing projections 10 and serve essentially as axial support of the securing ring 4.

For limiting the load or force on the drive plate 3, the bearing tongues 22 are preferably arranged and designed in such a manner to peripherally surround the side flanks 23 of each respective axial bearing projections 10". Thus, the load carrying cross-sectional surface of the bearing teeth 21 is enlarged, reducing the load or force from the clutch disks (not shown). On the other hand the bearing teeth 21 and bearing tongues 22 can be formed to have locking contact with the flanks 23 of the axial bearing projections 10" to supplement the load applied to the load teeth 20. For limiting the load of the drive plate 3 and the disk carrier 2, 6, in particular for avoiding an axial end sided fissures which would adversely affect stability, the drive plate 3 preferably exhibits no load teeth 20 between the bearing tongues 22 and the respective bearing teeth 23, and the disk carrier 2, 6 respectively exhibits no cutouts 13 at the axial bearing projections 10".

On the basis of the radial extension of the load teeth 20 through the cutouts 13 torque is transmitted between the drive plate 3 and the disk carrier 2 form fittingly by the direct contact of the outer peripheral flanks 27 of the load teeth 20 with the circumferential inner walls 15 of the cutouts 13. In order to limit the axial dimensions of the disk clutch 1, as discussed above, the cutouts 13 are located centrally in the inwardly extending axial projections of the disk carrier 2, 6. Thereby, it is accomplished that the load teeth 20 can be designed to be sufficiently high without radially projecting beyond the outwardly extending axial grooves 9, while still providing compensation for the outward thermal expansion of the disk carrier 2, 6. In other words, the load teeth 20 do not radially project beyond, in the case of an outer disk carrier 6, the outer contour, and in the case of an inner disk carrier 2, the inner contour, of the disk carrier.

By appropriate sizing and arrangement of the cutouts 13, the load teeth 20, and the bearing teeth 21 of the drive plate 3, it is accomplished that the drive plate 3 in the assembled condition is connected axially free of play with the disk carrier 2. Furthermore, by the appropriate sizing and arrangement of the annular groove 17 of the disk carrier 2, the depth of the inner walls of the cutouts 13, and the thickness of the drive plate 3 and the securing ring 4, it is accomplished that the drive plate 3 in the assembled condition is connected radially free of play with the disk carrier 2. The axial inner sides 24 of the load teeth 20 support themselves thereby radially inwardly against the axial inner walls 14 of the cutouts 13, while the axial outer sides 25 of the bearing teeth 21 or, as the case may be, bearing tongues 22 support themselves against the axial inner sides 26 of the securing ring 4.

Figure 3:
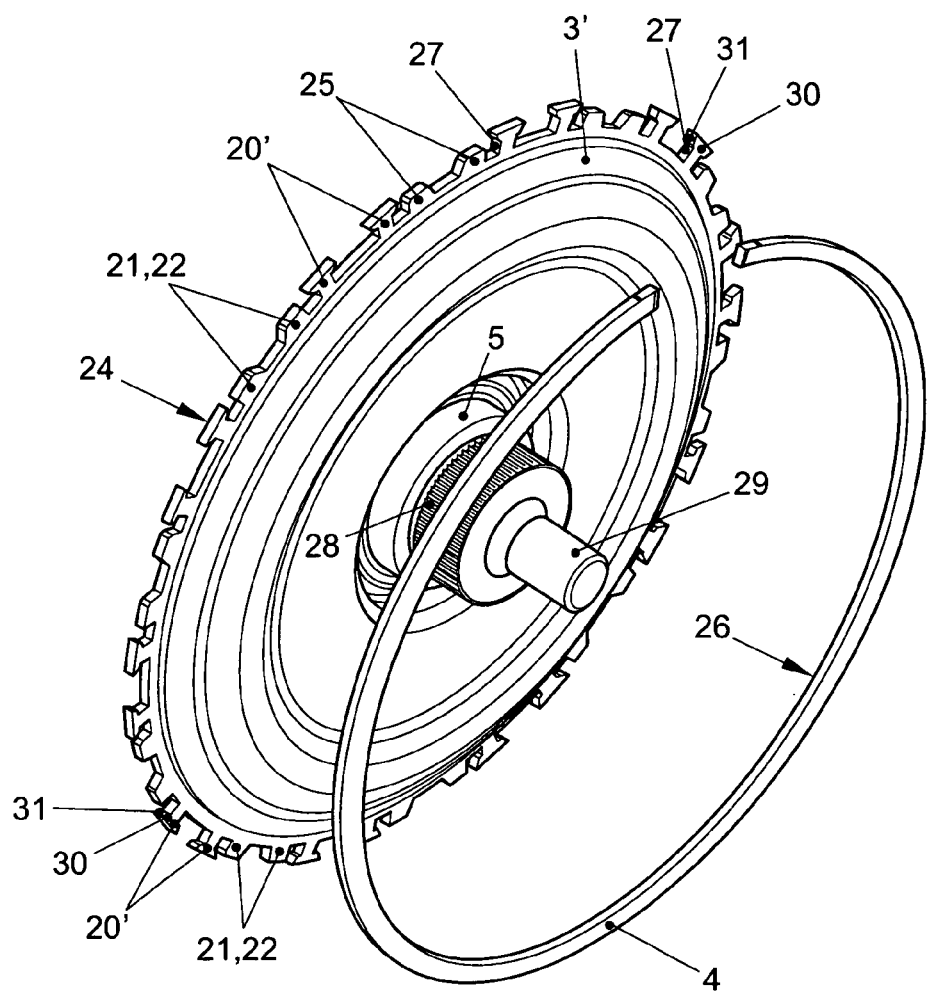
FIG. 3 is a second embodiment of the drive plate of the disk carrier assembly of the present invention in perspective representation.

In FIG. 3 a second embodiment of the drive plate 3' is shown together with the hub 5 and the securing ring 4. The drive plate 3' differs from the drive plate 3 according to FIG.

2 only by the different type of load teeth 20'. Here the load teeth 20' include a wedge shaped portion 30 that extends radially outward from the quadrilateral shaped portion of the teeth 20'. More specifically, the load teeth 20' extend radially outwardly on both sides respectively as a peripheral wedge or widening 30 with inner wedge surfaces 31, which are provided for contacting against the circumferential inner walls 15 of the cutouts 13 in the case of a widening or expansion of the disk carrier 2, 6. Following warm up of the disk clutch 1 or on the basis of the centrifugal forces acting upon the rotating disk carrier 2, 6, the carrier expands circumferentially and therewith also radially. Since the drive plate 3' expands less strongly upon heating than the disk carrier 2, there results, by employment of the load teeth 20' of the present embodiment according to FIG. 3, upon operational warming up, a contacting of the of the inner wedge surfaces 31 of the load teeth 20' with the circumferential inner walls 15 of the cutouts 13, any expansion of the segment 8 of the disk carrier 2, 6 brought about by thermal expansion and centrifugal forces can be prevented or at least strongly reduced.

In FIG. 4 the disk carrier 2, the drive plate 3, 3', the securing ring 4 and the hub 5 are shown in a radial sectional view in the assembled condition. It can be seen, that the hub 5 exhibits a step or shoulder 32 with an outer cylinder surface 33 and the drive plate 3, 3' exhibits an open central bore 34 with a corresponding inner cylindrical surface 35. The hub 5 exhibits outer teething 28 for the drive side introduction of torque and a bearing shaft 29 for mounting in a drive-sided guide bearing. The radial shoulder 32 of the hub 5 is in sliding contact with the drive plate 3, 3'. The drive plate 3, 3' can therewith be adjusted axially relative to the hub 5 by axial sliding 36 before the hub 5 and the drive plate 3, 3' are fixedly mounted to each other along the contact of the central bore 34 and the radial shoulder 32, which can be accomplished by welding at 38, for example.

By the axial securing of the drive plate 3, 3' relative to the disk carrier 2, 6 in accordance with the invention there is avoided, in a very space saving and cost effect mode and manner, axial slippage between the load teeth 20, 20' of the drive plate 3, 3' and the cutouts 13 of the disk carrier 2, 6 during operation, and therewith there is avoided greater wear at the concerned contact surface, in particular between the circumferential flanks 27 of the load teeth 20, 20' and the circumferential inner walls 15 of the cutouts 13, which would otherwise have been associated with elevated tooth flank play and stronger development of noise.

The invention claimed is:

1. A disk carrier assembly for a multi-disk clutch comprising:

a disk plate having a plurality of radially extending load teeth and a plurality of radially extending bearing teeth, said load teeth and said bearing teeth alternately disposed about the circumference of said disk plate;

a disk carrier having an axially extending cylinder segment, said segment including a plurality of axial protrusions that extend radially inward and a plurality of axial grooves that extend radially outward, said protrusions and said grooves are alternately disposed about said segment, said axial grooves adapted to radially retain a plurality of clutch disks while allowing operative axial movement;

said plurality of axial protrusions further including a plurality of axial load protrusions and a plurality of axial bearing protrusions, each said axial load protrusion having a load tooth cutout formed on its axial end and each said axial bearing protrusion having an elongated area with an annular retaining groove, said axial bearing protrusions alternately disposed between said axial load protrusions;

said drive plate operatively mounted within said disk carrier such that said load teeth of said drive plate directly engage said load teeth cutouts of said axial load protrusions preventing radial free play between said disk carrier and said disk plate, said bearing teeth operatively disposed circumferentially within said axial bearing protrusions; and a securing ring radially disposed in each of said annular retaining grooves adapted to operatively secure said disk plate within said disk carrier by pressing against said bearing teeth such that said load teeth press against said load teeth cutouts thereby removing axial free play between said disk carrier and said disk plate.

2. A disk carrier assembly as set forth in claim 1 wherein each of said plurality of radially extending load teeth are formed having a quadrilateral shape with square sides, said load tooth cutouts having corresponding interior walls with square sides such that said square sides of said load teeth operatively engage said square sides of said interior walls of said load tooth cutouts to prevent radial free play between said disk plate and said disk carrier.

3. A disk carrier assembly as set forth in claim 1 wherein said plurality of radially extending load teeth are disposed in pairs about said disk plate and said plurality of axial load protrusions having a load tooth cutout are correspondingly disposed in pairs about said disk carrier such that said pairs of radially extending load teeth operatively engage said pairs of axial load protrusions.

4. A disk carrier assembly as set forth in claim 3 wherein each of said plurality of axial bearing protrusions on said disk carrier are operatively engaged by a pair of said plurality of radially extending bearing teeth on said disk plate such that said disk plate further alternates said pairs of radially extending load teeth with pairs of radially extending bearing teeth and said disk carrier correspondingly alternates said pairs of axial load protrusions having load tooth cutouts with one of said plurality of bearing protrusions.

5. A disk carrier assembly as set forth in claim 4 wherein the two radially extending bearing teeth of each said pair of radially extending bearing teeth are formed symmetrical and opposite to each other, each having one sloped radial side such that the two said sloped sides of each said pair of radially extending bearing teeth cooperatively support each of the axial bearing protrusions on said disk carrier.

6. A disk carrier assembly as set forth in claim 1 wherein said plurality of radially extending load teeth are formed having a quadrilateral shaped portion with square sides, said load tooth cutouts having corresponding interior walls with square sides such that said square sides of said load teeth operatively engage said square sides of interior walls of said load tooth cutouts to prevent axial free play between said disk plate and said disk carrier, each said radially extending load tooth further including a wedge shaped portion extending in the radially outward direction beyond said quadrilateral shaped portion so as to prevent outward radial expansion of said disk carrier.

7. A disk carrier assembly as set forth in claim 1 that further includes:
   a hub having a radial shoulder, said hub adapted to engage a drive shaft within a transmission; and
   an open central bore formed in said disk plate, said radial shoulder of said hub adapted to be in a sliding contact with said open central bore of said disk plate such that during assembly of said disk carrier assembly, said sliding contact between said radial shoulder of said hub and said disk plate allows said disk plate to be axially adjusted relative to said hub before said hub and said disk plate are fixedly mounted to each other along said contact of said central bore and said radial shoulder.

* * * * *